(12) United States Patent
Sommerer et al.

(10) Patent No.: US 11,951,341 B2
(45) Date of Patent: Apr. 9, 2024

(54) AIRCRAFT PROPULSION ASSEMBLY HAVING A VENTILATION SYSTEM AND A FIRE-FIGHTING SYSTEM

(71) Applicant: Airbus Operations SAS, Toulouse (FR)

(72) Inventors: Yannick Sommerer, Toulouse (FR); Maxime Zebian, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 282 days.

(21) Appl. No.: 17/575,389

(22) Filed: Jan. 13, 2022

(65) Prior Publication Data
US 2022/0219029 A1 Jul. 14, 2022

(30) Foreign Application Priority Data
Jan. 14, 2021 (FR) .................................... 2100337

(51) Int. Cl.
| | |
|---|---|
| *A62C 3/08* | (2006.01) |
| *A62C 35/02* | (2006.01) |
| *A62C 37/44* | (2006.01) |
| *F02C 7/25* | (2006.01) |
| *B64D 45/00* | (2006.01) |

(52) U.S. Cl.
CPC ................ *A62C 3/08* (2013.01); *A62C 35/02* (2013.01); *A62C 37/44* (2013.01); *F02C 7/25* (2013.01); *B64D 2045/009* (2013.01); *F05D 2270/09* (2013.01)

(58) Field of Classification Search
CPC ... A62C 3/08; A62C 35/02; F02C 7/25; F02C 7/04; B64D 2045/009
See application file for complete search history.

(56) References Cited

U.S. PATENT DOCUMENTS

| | | | | |
|---|---|---|---|---|
| 10,066,551 B2 * | 9/2018 | Verseux | ................... | F02C 7/32 |
| 10,760,496 B2 * | 9/2020 | Muller | ...................... | F02C 7/22 |
| 2012/0103638 A1 * | 5/2012 | Mickelsen | ................ | F02C 7/25 |
| | | | | 169/46 |

(Continued)

FOREIGN PATENT DOCUMENTS

EP 2851300 B1 5/2016

OTHER PUBLICATIONS

French Search Report; priority document.

*Primary Examiner* — Joseph A Greenlund
(74) *Attorney, Agent, or Firm* — Greer, Burns & Crain, Ltd.

(57) ABSTRACT

A propulsion assembly with an outer compartment, an inner compartment, a supply pipe and a transfer pipe between the two compartments, a suction system between the two pipes, a regulating element that regulates the flow rate of air in the suction system and a fire-fighting system having a reservoir of extinguishing fluid, a discharge pipe connected to the reservoir, and a control system between the reservoir and the discharge pipe. The discharge pipe is configured and arranged to supply the transfer pipe when the control system is in the open position. The outside air is then driven by the suction system and passes through the two compartments in a forced manner and the extinguishing fluid reaches the transfer pipe to flow into the inner compartment.

6 Claims, 6 Drawing Sheets

(56) References Cited

U.S. PATENT DOCUMENTS

| | | | |
|---|---|---|---|
| 2012/0217027 A1* | 8/2012 | Chattaway | A62C 99/0018 169/46 |
| 2015/0267616 A1 | 9/2015 | Verseux | |
| 2017/0096238 A1* | 4/2017 | Porte | B64D 27/18 |
| 2019/0126082 A1* | 5/2019 | Wright | F16L 53/38 |
| 2019/0351269 A1* | 11/2019 | Phung | A62C 3/08 |
| 2020/0171429 A1* | 6/2020 | Giroud | H01M 8/04843 |
| 2020/0240361 A1 | 7/2020 | Schacht | |
| 2020/0298036 A1* | 9/2020 | Partridge | B64D 45/00 |
| 2020/0300171 A1* | 9/2020 | Sawyers-Abbott | F02C 9/18 |
| 2020/0324154 A1* | 10/2020 | Cayssials | A62C 35/13 |
| 2021/0353986 A1* | 11/2021 | Clavel | A62C 35/02 |
| 2022/0024599 A1* | 1/2022 | Cayssials | B64D 29/02 |
| 2022/0219029 A1* | 7/2022 | Sommerer | A62C 37/44 |
| 2023/0381563 A1* | 11/2023 | Freyling | A62C 3/10 |

\* cited by examiner

AIRCRAFT PROPULSION ASSEMBLY HAVING A VENTILATION SYSTEM AND A FIRE-FIGHTING SYSTEM

CROSS-REFERENCES TO RELATED APPLICATIONS

This application claims the benefit of the French patent application No. 2100337 filed on Jan. 14, 2021, the entire disclosures of which are incorporated herein by way of reference.

FIELD OF THE INVENTION

The present invention relates to an aircraft propulsion assembly having two fairing devices, a ventilation system ensuring the ventilation of compartments that are delimited inside each fairing device and a fire-fighting system.

The invention also relates to an aircraft equipped with such a propulsion assembly.

BACKGROUND OF THE INVENTION

Throughout the present description, the "upstream" and "downstream" directions are defined relative to the overall direction of the flow of the gases in the turbomachine, and the terms "front" and "rear" are to be considered relative to a direction F of forward movement of the aircraft under the effect of the thrust produced by the turbine engine, this direction being parallel to a longitudinal axis X of the propulsion assembly and of the turbine engine.

Figure 8:
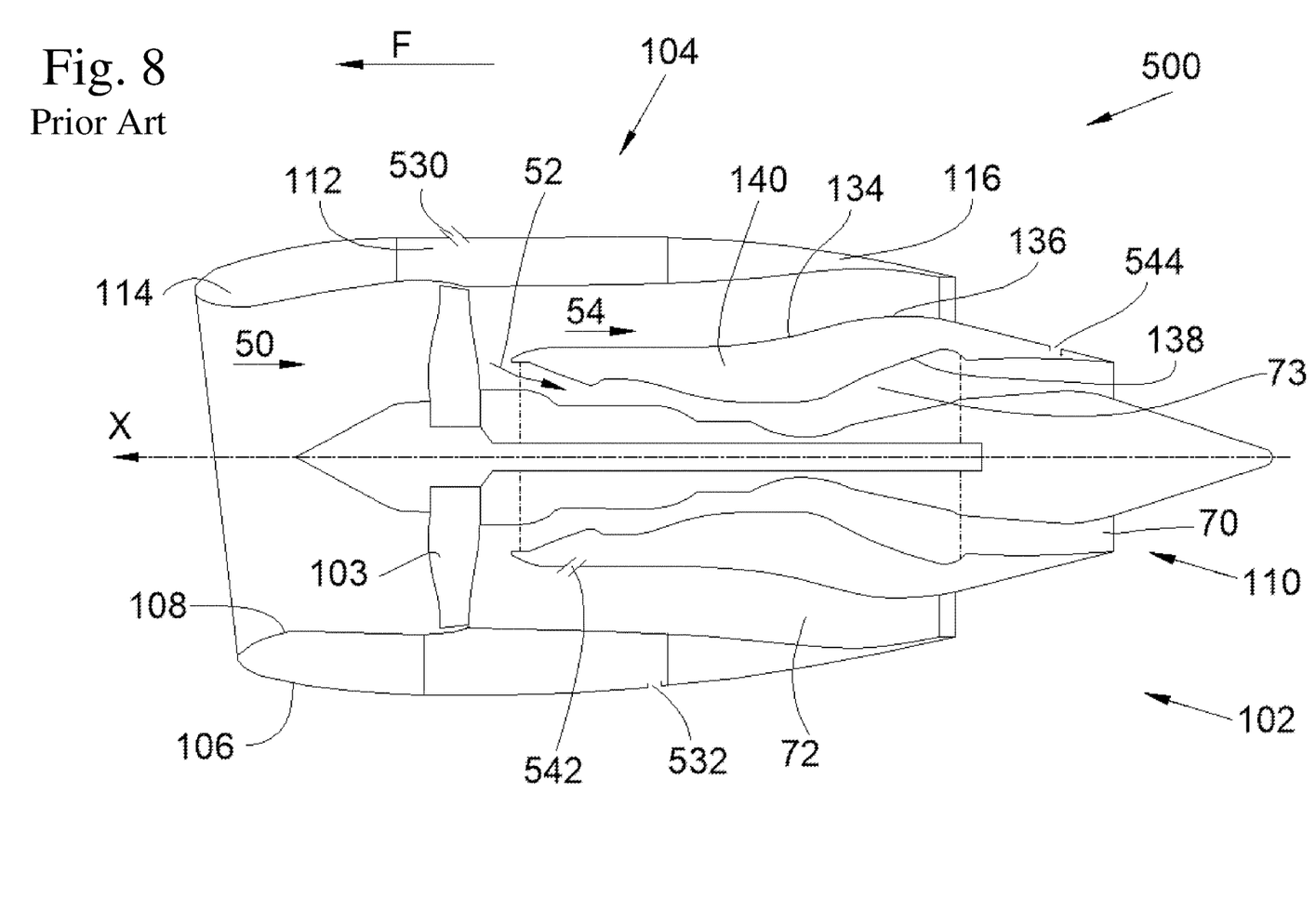
FIG. 8 is an axial cross section of a propulsion assembly of the prior art.

FIG. 8 shows an axial section of a propulsion assembly 500 of the prior art that has a turbofan 102 with a fan 103 and an outer fairing device 104 that surrounds the turbofan 102.

The outer fairing 104 has an external annular wall 106 and an internal annular wall 108. The external annular wall 106 forms an outer fairing along which the outside air flows. The internal annular wall 108 channels an incoming flow of air 50 that supplies the turbofan 102 and is divided downstream of the fan 103 into a primary flow 52 and a secondary flow 54.

The primary flow 52 flows inside the core 110 that, in this case, has, in succession, in the direction of flow of the primary flow 52, a compression chamber, a combustion chamber, and a turbine chamber. The primary flow 52 is evacuated via the jet pipe 70.

The secondary flow 54 flows around the core 110 in a secondary duct 72 and the primary flow 52 flows inside the core 110 in a primary duct 73.

The external annular wall 106 and internal annular wall 108 delimit between them an outer compartment 112 of the outer fairing device 104, also called "fan compartment", which is positioned between an air intake 114 and a thrust reverser 116.

This outer compartment 112 contains equipment, some of which has to be ventilated and thus kept under a determined temperature.

In order to ensure the ventilation of the outer compartment 112 and of the equipment possibly housed therein, the outer fairing device 104 has an air intake orifice 530 and an air exhaust orifice 532 that are formed in the external annular wall 106 of the outer compartment 112. These two orifices 530 and 532 are in general diametrically opposite one another relative to the longitudinal axis X. The air intake orifice 530 generally takes the form of a scoop that allows the outside air to be drawn into the outer compartment 112 and the air exhaust orifice 532 generally takes the form of a grill that allows the air to be drawn towards the outside.

The flow of air thus admitted into the outer compartment 112 then forms a ventilation flow circulating in the outer compartment 112 so as to end up leaving the latter through the air exhaust orifice 532 and thus ventilate and cool the inside of the outer compartment 112 and the equipment present.

On the inside, the secondary flow 54 flows along an inner fairing device 134 comprising an external annular wall 136 and an internal annular wall 138 that delimit between them an inner compartment 140, commonly called "core compartment", and the external annular wall 136 is sometimes called "IFS" ("Inner Fixed Structure").

The secondary duct 72 is delimited between the external annular wall 136 of the inner fairing 134 and the internal annular wall 108 of the outer fairing 104. The primary duct 73 is delimited inside the internal annular wall 138 of the inner fairing 134.

As before, the inner compartment 140 has to be ventilated and, to this end, the external annular wall 136 has one or more air intake apertures 542 and one or more air exhaust apertures 544 that are distributed about the longitudinal axis X. Each air intake aperture 542 allows the air of the secondary flow 54 to be admitted into the inner compartment 140 and each air exhaust aperture 544 allows the air of the inner compartment 140 to be rejected towards the outside.

As is the case for the orifices 530 and 532, the apertures 542 and 544 take, for example, the form of scoops or an annular opening.

This passive ventilation mode gives good results. However, when cruising, the supply of fresh air can be excessive relative to the actual needs, and during the taxiing phases, the supply of fresh air can be insufficient. To remedy the latter point, the orifices can be sized in accordance with this taxiing phase, and this will give rise to over-ventilation of the compartments in flight and lead to additional fuel consumption.

Furthermore, in the event of a fire, it is known to put in place a fire-fighting system that has a reservoir containing an extinguishing fluid and pipes that make it possible to channel the extinguishing fluid from the reservoir towards the outer compartment 112 and the inner compartment 140. The extinguishing fluid is generally the product known under the name "Halon". To comply with environmental requirements, Halon has to be replaced with new extinguishing fluids that require larger storage volumes for an effectiveness equivalent to Halon.

It is therefore desirable to find an arrangement that makes it possible to ensure the ventilation in the compartments, while optimizing the intake flow rates for the actual needs in terms of ventilation of each flight phase, and that is associated with a more compact fire-fighting system.

SUMMARY OF THE INVENTION

An object of the present invention is to propose a propulsion assembly for an aircraft, which has two fairing devices and a ventilation system ensuring the ventilation of compartments that are delimited inside each fairing device.

To that end, there is proposed a propulsion assembly for an aircraft and the propulsion assembly has:
a primary duct and a secondary duct,
an outer fairing having an external annular wall and an internal annular wall that delimit between them an outer compartment, wherein the external annular wall has an inlet opening, an inner fairing having an external annular wall and an internal annular wall that delimit between them an inner compartment, wherein the external annular wall has at least one air exhaust aperture, wherein the secondary duct is delimited between the internal annular wall of the outer fairing and the external annular wall of the inner fairing, wherein the primary duct is delimited inside the internal annular wall of the inner fairing, said propulsion assembly being characterized in that it also has:
- a suction system having an inlet, an outlet and mobile elements that are designed to draw air in via the inlet and deliver the drawn-in air via the outlet,
- a drive means designed to drive the mobile elements,
- a transfer pipe fluidically connected to the outlet of the suction system,
- a distribution pipe disposed in the inner compartment, fluidically connected to the transfer pipe and having a plurality of nozzles,
- a supply pipe of which one end opens into the outer compartment and of which the other end is fluidically connected to the inlet of the suction system,
- a regulating means arranged so as to regulate the flow rate of air in the suction system, and
- a fire-fighting system having a reservoir containing an extinguishing fluid, a discharge pipe of which a first end is fluidically connected to the reservoir, and a control system interposed between the reservoir and the discharge pipe that alternately adopts a closed position preventing the extinguishing fluid from flowing into the discharge pipe or an open position allowing the extinguishing fluid to flow into the discharge pipe, and wherein a second end of the discharge pipe opens directly into the transfer pipe so as to supply it, when the control system is in the open position.

To that end, there is also proposed a propulsion assembly for an aircraft and the propulsion assembly has:
- a primary duct and a secondary duct,
- an outer fairing having an external annular wall and an internal annular wall that delimit between them an outer compartment, wherein the external annular wall has an inlet opening,
- an inner fairing having an external annular wall and an internal annular wall that delimit between them an inner compartment, wherein the external annular wall has at least one air exhaust aperture, wherein the secondary duct is delimited between the internal annular wall of the outer fairing and the external annular wall of the inner fairing, wherein the primary duct is delimited inside the internal annular wall of the inner fairing, the propulsion assembly being characterized in that it also has:
- a suction system having an inlet, an outlet and mobile elements that are designed to draw air in via the inlet and deliver the drawn-in air via the outlet,
- a drive means designed to drive the mobile elements,
- a transfer pipe fluidically connected to the outlet of the suction system,
- a distribution pipe disposed in the inner compartment, fluidically connected to the transfer pipe and having a plurality of nozzles,
- a supply pipe of which one end opens into the outer compartment and of which the other end is fluidically connected to the inlet of the suction system,
- a regulating means arranged so as to regulate the flow rate of air in the suction system, and
- a fire-fighting system having a reservoir containing an extinguishing fluid, a discharge pipe of which a first end is fluidically connected to the reservoir, and a control system interposed between the reservoir and the discharge pipe that alternately adopts a closed position preventing the extinguishing fluid from flowing into the discharge pipe or an open position allowing the extinguishing fluid to flow into the discharge pipe, and wherein a second end of the discharge pipe opens directly into the outer compartment so as to supply the transfer pipe, when the control system is in the open position.

In each of these two embodiments, the outside air is then driven by the suction system and passes through the two compartments in a forced manner and the fire-fighting system uses the transfer pipe and the distribution pipe to diffuse the extinguishing product within the compartments in question. The flow rate of ventilation in the compartments in question in the event of a fire is then significant and the quantity of extinguishing product can therefore be smaller for the same effectiveness since this significant flow rate allows a rapid and highly concentrated supply of the extinguishing product.

Advantageously, the fire-fighting system also has a discharge sub-pipe of which a first end opens into the discharge pipe and of which a second end opens into the outer compartment.

Advantageously, the control system has a first control sub-system and a second control sub-system, wherein the first control sub-system controls the flow of the extinguishing fluid into the discharge pipe and wherein the second control sub-system controls the flow of the extinguishing fluid into the discharge sub-pipe.

The invention also proposes an aircraft having at least one propulsion assembly according to one of the preceding variants.

BRIEF DESCRIPTION OF THE DRAWINGS

The abovementioned features of the invention, along with others, will become more clearly apparent upon reading the following description of an exemplary embodiment, the description being given with reference to the appended drawings, in which.

DETAILED DESCRIPTION OF THE PREFERRED EMBODIMENTS

Figure 1:
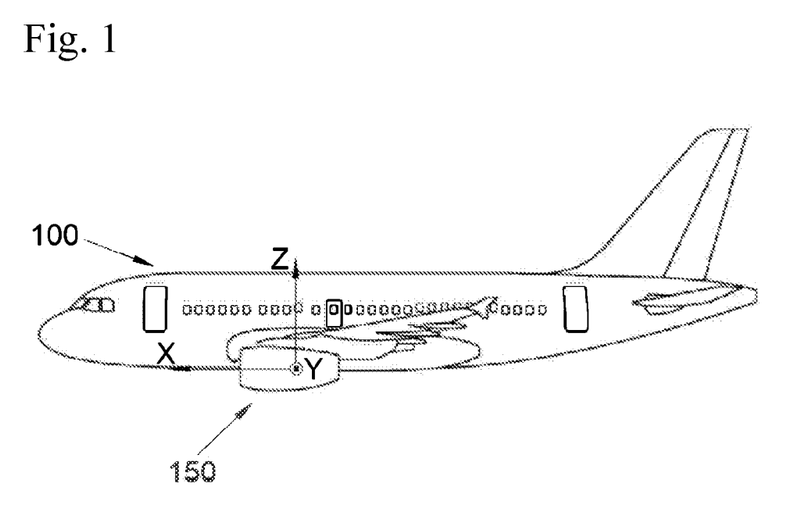
FIG. 1 is a side view of an aircraft having a propulsion assembly according to the invention.

FIG. 1 shows an aircraft 100 that has a propulsion assembly 150 according to the invention that has a turbofan.

In the following description, and by convention, the X direction is the longitudinal direction of the propulsion assembly and of the turbofan, with positive orientation in the direction of forward movement of the aircraft 100, the Y direction is the transverse direction of the propulsion assembly and of the turbofan, which is horizontal when the aircraft is on the ground, and the Z direction is the vertical direction or vertical height when the aircraft is on the ground, these three directions X, Y and Z being mutually orthogonal.

Figure 2:
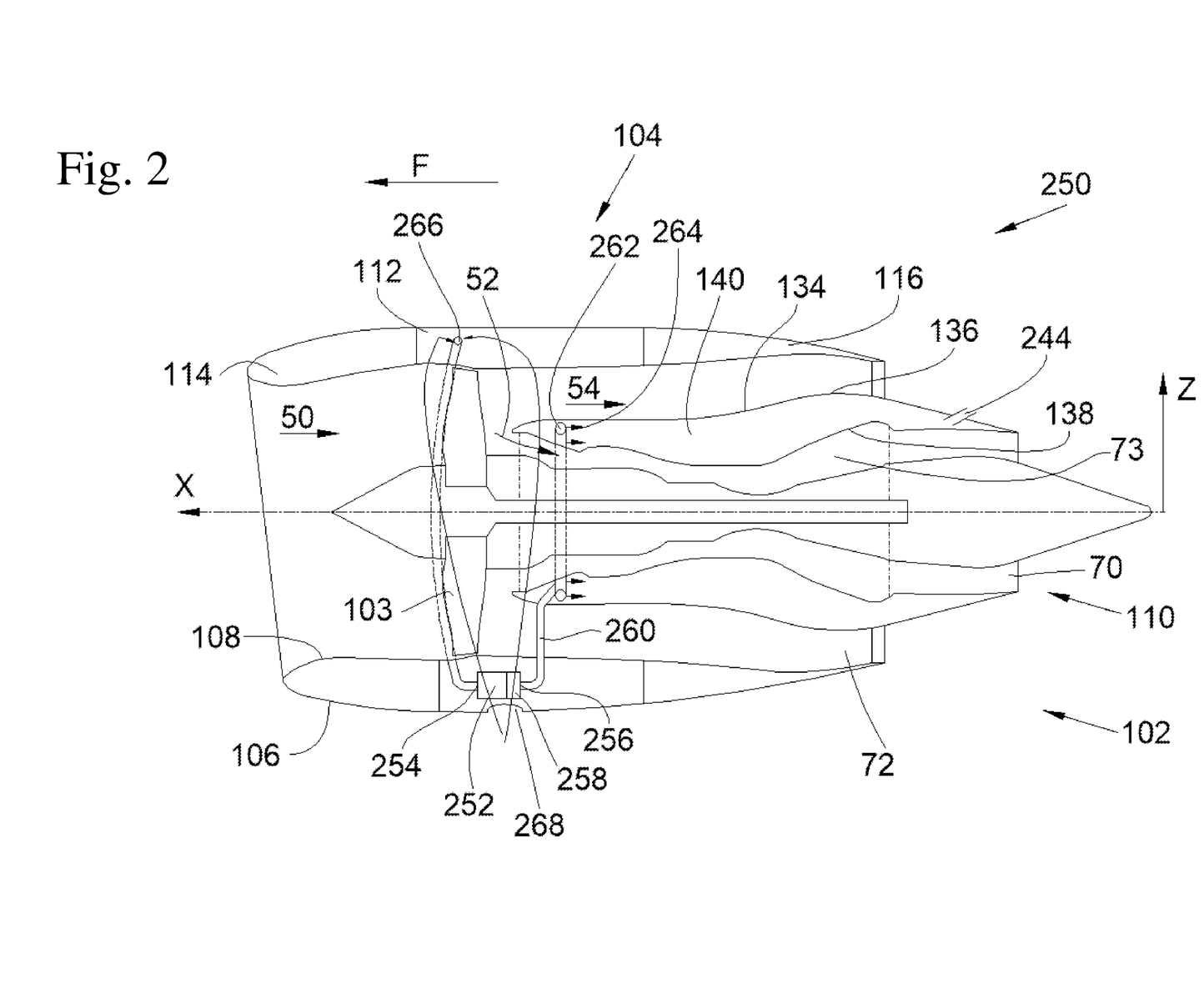
FIG. 2 is an axial cross section of a propulsion assembly according to a first embodiment of the invention.
Figure 3:
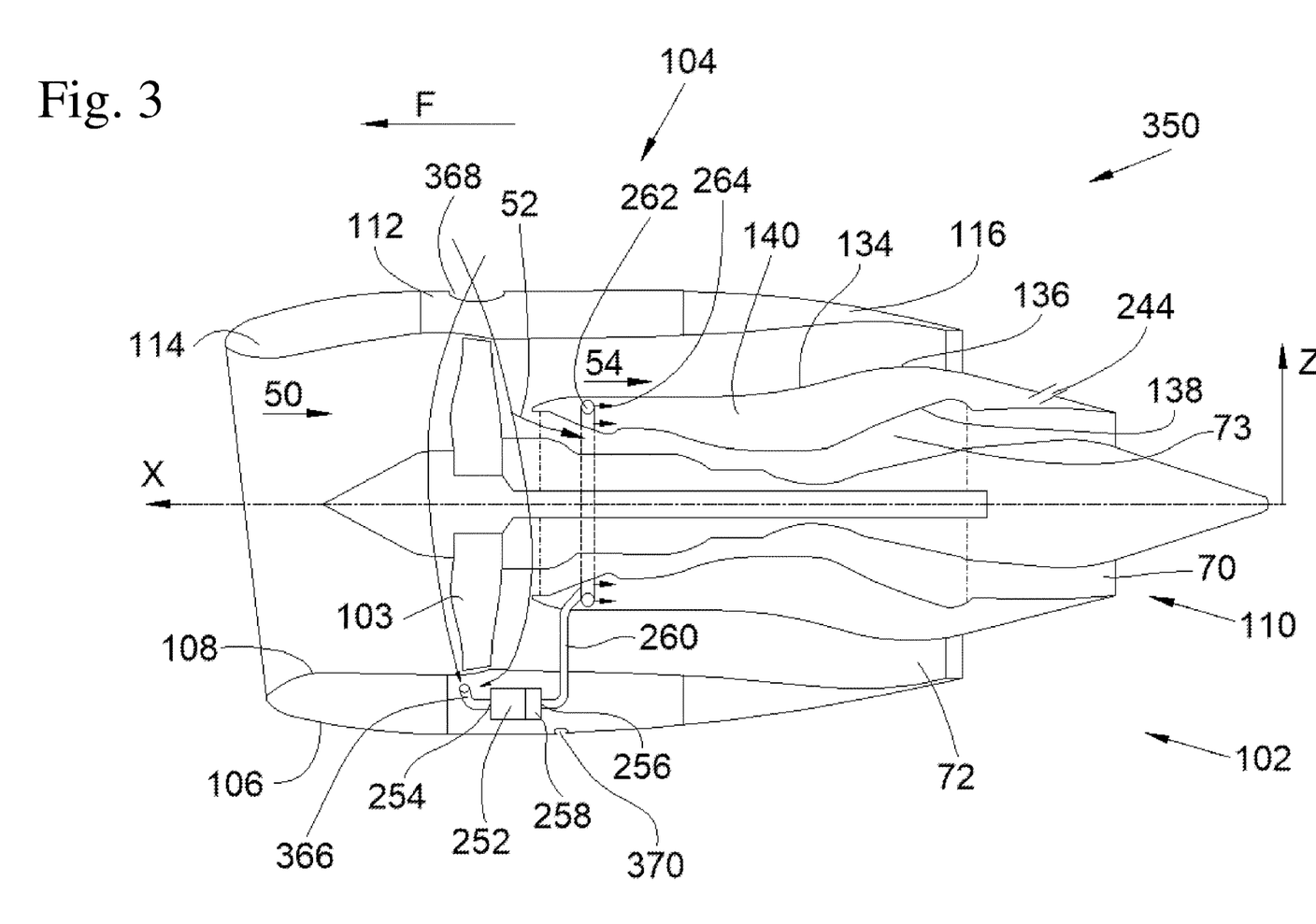
FIG. 3 is an axial cross section of a propulsion assembly according to a second embodiment of the invention.

FIG. 2 shows a propulsion assembly 250 according to a first embodiment of the invention and FIG. 3 shows a propulsion assembly 350 according to a second embodiment of the invention.

Figure 4:
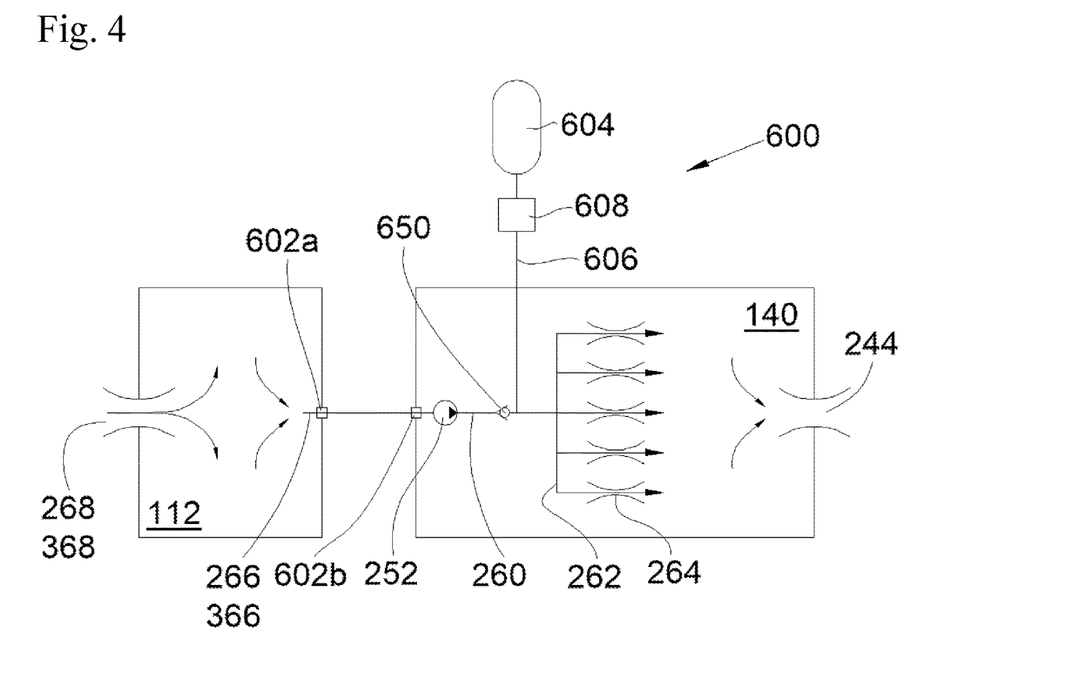
FIG. 4 is a schematic depiction of the fire-fighting system according to a first embodiment of the invention.

The propulsion assembly 250, 350 according to the invention is similar to the propulsion assembly 500 of the prior art, and elements common to the propulsion assembly 500 in FIG. 4 and the propulsion assemblies 250 and 350 according to the invention bear the same references.

The propulsion assembly 250, 350 has a suction system 252 having an inlet 254 and an outlet 256 and mobile elements, such as the blades of a pump or of a compressor, for example, which are designed, when they move, to draw the air in via the inlet 254 and deliver the drawn-in air via the outlet 256.

The propulsion assembly 250, 350 also has a drive means 258 that drives the movement of the mobile elements and thus causes the suction system 252 to operate, so as to cause it to draw in and deliver the air. This drive means 258 is, for example, an electric motor or a gearbox connecting, via transmission shafts, a rotor of the turbofan 102 to the mobile elements.

The propulsion assembly 250, 350 also has a transfer pipe 260 fluidically connected to the outlet 256 of the suction system 252.

The propulsion assembly 250, 350 also has a distribution pipe 262 that is disposed in the inner compartment 140 and is fluidically connected to the transfer pipe 260. The distribution pipe 262 has a plurality of nozzles 264 allowing the air to leave the distribution pipe 262 towards the interior of the inner compartment 140.

The external annular wall 136 of the inner compartment 140 has at least one air exhaust aperture 244 that forms a connection between the inner compartment 140 and the outside and allows the air of the inner compartment 140 to be rejected towards the outside. Thus, the air that arrives via the nozzles 264 passes through the inner compartment 140 and leaves via the air exhaust aperture 244.

The propulsion assembly 250, 350 also has a supply pipe 266, 366 of which one end opens into the outer compartment 112 and of which the other end is fluidically connected to the inlet 254 of the suction system 252.

The propulsion assembly 250, 350 also has an inlet opening 268, 368 that passes through the external annular wall 106 of the outer compartment 112 so as to allow the outside air to be introduced into the outer compartment 112. The inlet opening 268, 368 forms a connection between the outer compartment 112 and the outside.

Thus, when the suction system 252 is in operation, it causes a depression in the outer compartment 112 and this compels the outside air to enter the outer compartment 112 via the inlet opening 268, 368. The air then enters the supply pipe 266, 366 so as to pass through the suction system 252 and be expelled towards the distribution pipe 262 and then the inner compartment 140 where the air leaves towards the outside via the air exhaust aperture 244.

In order to regulate the air flow rate, the propulsion assembly 250, 350 has a regulating means that regulates the flow rate of air in the suction system 252.

According to one particular embodiment, the regulating means can be passive and take, for example, the form of a valve that is mounted on the supply pipe 266, 366 and opens/closes according to the pressure in the supply pipe 266, 366. According to another exemplary embodiment, the regulating means can be a heat pipe associated with a mechanical regulating system, of the valve type, wherein the heat pipe transports temperature information from at least one of the compartments 112, 140 to the mechanical regulating system.

According to another particular embodiment, the regulating means can be active, and it takes the form of a control unit, such as a controller, and sensors, wherein the control unit controls the drive means 258 so as to accelerate or slow the mobile elements of the suction system 252 according to the needs of the aircraft 100, and in particular according to information, in particular temperature information, delivered by the sensors distributed in the propulsion assembly 150, 250, 350.

The forced ventilation caused by the presence of the suction system 252 can thus be regulated according to the needs of the aircraft 100. Furthermore, since the ventilation is forced, the inlet opening 268, 368 does not need to take the form of a scoop, and it can be only a hole that remains flush with the external annular wall 106 and generates only very limited additional drag. Furthermore, a single suction system allows both compartments to be ventilated and cooled.

In the case of an active regulating means, the propulsion assembly 150 can thus have, for example, at least one temperature sensor that measures the temperature of equipment to be monitored in the inner compartment 140 or the outer compartment 112 and that is connected to the control unit and, according to a predefined temperature threshold, the control unit will instruct the drive means 258 so as to accelerate or slow the suction system 252.

The control unit comprises, for example, connected by a communication bus: a processor or CPU (central processing unit); a random-access memory (RAM); a read-only memory (ROM); a storage unit such as a hard disk or a storage medium reader, such as an SD (secure digital) card reader; at least one communication interface that allows the control unit to communicate, inter alia, with the suction system 252 and the sensors. The communication interface also makes it possible to communicate with the system for regulating and monitoring the engine (also known as "FADEC" in the art) that collects data relating to fire detection and triggers, if necessary, the extinguishing procedures.

The processor CPU is capable of executing instructions loaded into the RAM from the ROM, from an external memory (not shown), from a storage medium (such as an SD card), or from a communication network (not shown). When the controller C is powered up, the processor CPU is capable of reading instructions from the RAM and of executing them. These instructions form a computer program that causes the processor CPU to implement all or some of the algorithm and the steps described here.

In order to ensure better agitation of the air in the outer compartment 112, the inlet opening 268, 368 and the open end of the supply pipe 266, 366 that opens into the outer compartment 112 are diametrically opposite one another relative to the longitudinal axis X. Thus, the air that enters via the inlet opening 268, 368 has to pass through half of the outer compartment 112, for one part of the flow of air via the port side and for another part of the flow via the starboard side, so as to reach the end of the supply pipe 266, 366.

In the embodiment in FIG. 2, the inlet opening 268 is in the bottom part of the propulsion assembly 250 and the open end of the supply pipe 266 is disposed in the top part of the propulsion assembly 250.

The inlet opening 268 can thus also act as a drainage opening so as to evacuate the liquids that could be present in the outer compartment 112.

In this embodiment, the suction system 252 is in the bottom part of the outer compartment 112 and the supply pipe 266 then passes through half of the outer compartment 112.

In the embodiment in FIG. 3, the inlet opening 368 is in the top part of the propulsion assembly 350 and the open end of the supply pipe 366 is disposed in the bottom part of the propulsion assembly 350.

In the bottom part of the propulsion assembly 350, an additional opening 370 is then provided through the external annular wall 106 of the outer compartment 112 so as to ensure drainage of liquids that could be present in the outer compartment 112.

In this embodiment, the suction system 252 is in the bottom part of the outer compartment 112 and the supply pipe 366 is relatively short.

In order to make the circulation of the air in the inner compartment 140 easier, the distribution pipe 262 and the nozzles 264 are at the front of the inner compartment 140 and the or each air exhaust aperture 244 is at the rear of the inner compartment 140.

In the embodiment of the invention that is presented in FIGS. 2 and 3, the distribution pipe 262 takes the form of a ring torus coaxial with the longitudinal axis X, and the nozzles 264 are distributed along the torus and oriented towards the rear so as to eject the air towards the rear of the inner compartment 140.

In the embodiment of the invention that is presented in FIGS. 2 and 3, the suction system 252 is arranged in the outer compartment 112, but it could be disposed elsewhere, such as in the inner compartment 140, for example.

FIGS. 4 to 7 show fire-fighting systems 600, 700, 800, 900 according to various embodiments. These various embodiments can be implemented in a propulsion assembly 150, 250, 350 according to the various embodiments described above. In the embodiment in FIG. 4, the suction system 252 is shown in the inner compartment 140, but it could be in the outer compartment 112. In the same way, in the embodiments in FIGS. 5 to 7, the suction system 252 is shown in the outer compartment 112, but it could be in the inner compartment 140.

Each of FIGS. 4 to 7 shows the outer compartment 112 with the inlet opening 268, 368 that allows the outside air to be introduced and the inner compartment 140 with the air exhaust aperture 244. Between the two compartments 112 and 140 the supply pipe 266, 366 and the transfer pipe 260 extend in succession on either side of the suction system 252, and the transfer pipe 260 joins the distribution pipe 262 that opens into the inner compartment 140 via the nozzles 264.

The walls of the outer compartment 112 and inner compartment 140 are passed through by the supply pipe 266, 366 and the transfer pipe 260 in this case via bulkhead fittings 602a-b.

In each of the embodiments in FIGS. 4 to 7, the fire-fighting system 600, 700, 800, 900 has a reservoir 604 containing an extinguishing fluid, a discharge pipe 606 of which a first end is fluidically connected to the reservoir 604, and a control system 608 interposed between the reservoir 604 and the discharge pipe 606 that alternately adopts a closed position preventing the extinguishing fluid from flowing into the discharge pipe 606 from the reservoir 604 or an open position allowing the extinguishing fluid to flow into the discharge pipe 606 from the reservoir 604. The control system 608 is controlled for example by the control unit.

The control system 608 is for example a controlled valve or a discharge head that has a disc that closes the reservoir 604 and an explosive cartridge that destroys the disc when it is activated.

The second end of the discharge pipe 606 is arranged so as to supply the transfer pipe 260, when the control system 608 is in the open position.

Thus, the extinguishing fluid is conveyed into the inner compartment 140 using the transfer pipe 260, and this allows a saving in terms of components.

In the embodiment in FIG. 4, the second end of the discharge pipe 606 opens directly into the transfer pipe 260, upstream of the nozzles 264. In this case, the discharge pipe 606 passes through the inner compartment 140, but depending on the position of the suction system 252, the discharge pipe 606 can join the transfer pipe 260 outside the inner compartment 140. In this embodiment, the inner compartment 140 is considered to be a potentially flammable zone, and the outer compartment 112 is not considered to be a potentially flammable zone.

Figure 5:
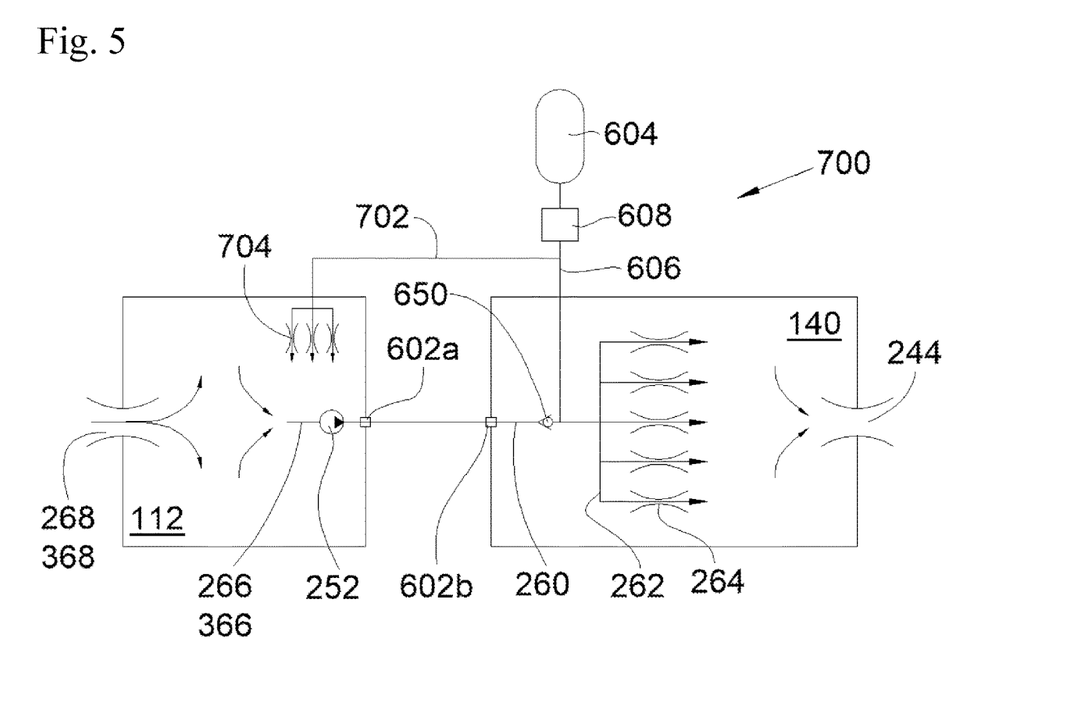
FIG. 5 is a schematic depiction of the fire-fighting system according to a second embodiment of the invention.

In the embodiment in FIG. 5, which is a variant of the embodiment in FIG. 4, the fire-fighting system 700 also has a discharge sub-pipe 702 of which a first end opens into the discharge pipe 606 and of which a second end opens into the outer compartment 112. Thus, the extinguishing fluid is distributed between the two compartments 112 and 140. Furthermore, the extinguishing fluid that is sent towards the outer compartment 112 then reaches the inner compartment 140 via the supply pipe 266, 366 and the transfer pipe 260. In this embodiment, the inner compartment 140 and the outer compartment 112 are considered to be potentially flammable zones. The second end of the discharge sub-pipe 702 opens in this case via nozzles 704.

Figure 6:
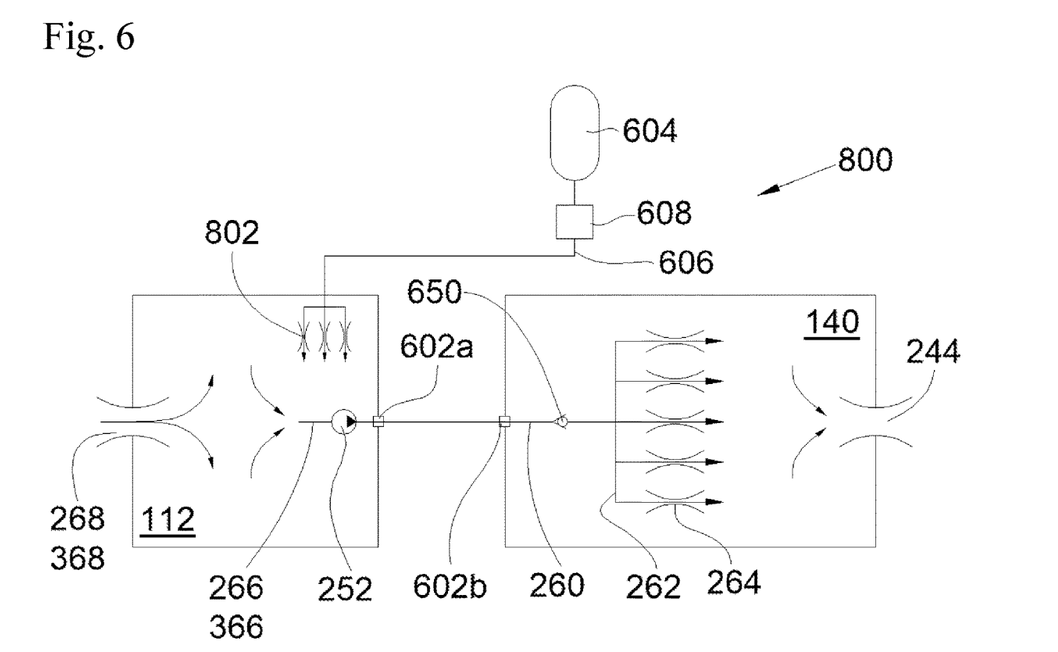
FIG. 6 is a schematic depiction of the fire-fighting system according to a third embodiment of the invention.

In the embodiment in FIG. 6, the second end of the discharge pipe 606 opens directly into the outer compartment 112, in this case via nozzles 802. The extinguishing fluid that is thus sent towards the outer compartment 112 then reaches the inner compartment 140 via the supply pipe 266, 366 and the transfer pipe 260. In this embodiment, the inner compartment 140 and the outer compartment 112 are considered to be potentially flammable zones.

Figure 7:
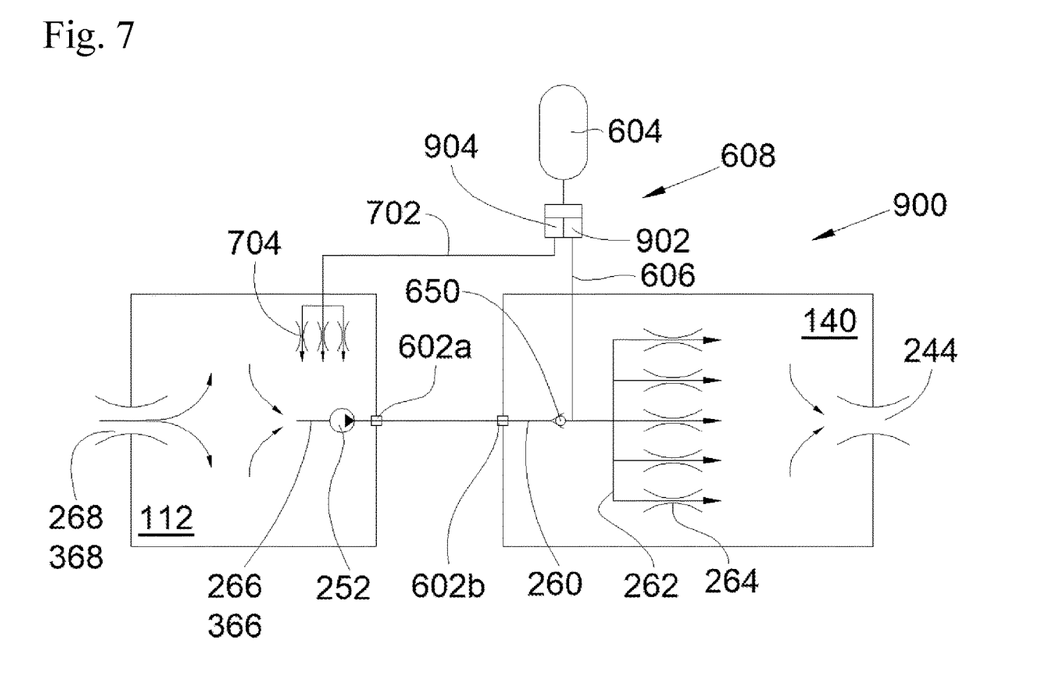
FIG. 7 is a schematic depiction of the fire-fighting system according to a fourth embodiment of the invention.

The embodiment in FIG. 7 is a variant of the embodiment in FIG. 5, in which the control system 608 has a first control sub-system 902 and a second control sub-system 904, wherein the first control sub-system 902 controls the flow of the extinguishing fluid into the discharge pipe 606 and wherein the second control sub-system 904 controls the flow of the extinguishing fluid into the discharge sub-pipe 702. The first control sub-system 902 and the second control sub-system 904 can be controlled independently so as to allow the flow into the discharge pipe 606 or the discharge sub-pipe 702 or both. In this embodiment, the inner compartment 140 and the outer compartment 112 are considered to be potentially flammable zones.

In each of the embodiments in FIGS. 4 to 7, the propulsion assembly has a non-return valve 650 that is arranged on the transfer pipe 260 between the suction system 252 and the nozzles 264, and more specifically, when the second end of the discharge pipe 606 opens directly into the transfer pipe 260, the non-return valve 650 is arranged on the transfer pipe 260 between the second end and the nozzles 264 so as to prevent the reflux of the air and the extinguishing fluid towards the suction system 252 and the outer compartment 112.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly for an aircraft, said propulsion assembly having:
    a primary duct and a secondary duct,
    an outer fairing having an external annular wall and an internal annular wall that delimit between them an outer compartment, wherein the external annular wall has an inlet opening,
    an inner fairing having an external annular wall and an internal annular wall that delimit between them an inner compartment, wherein the external annular wall has at least one air exhaust aperture,
    wherein the secondary duct is delimited between the internal annular wall of the outer fairing and the external annular wall of the inner fairing,
    wherein the primary duct is delimited inside the internal annular wall of the inner fairing,
    a suction system having an inlet, an outlet and mobile elements that are configured to draw air in via the inlet and deliver drawn-in air via the outlet,
    a drive means configured to drive the mobile elements,
    a transfer pipe fluidically connected to the outlet of the suction system,
    a distribution pipe disposed in the inner compartment, fluidically connected to the transfer pipe and having a plurality of nozzles,
    a supply pipe, of which one end opens into the outer compartment, and of which another end is fluidically connected to the inlet of the suction system,
    a regulating means configured and arranged to regulate a flow rate of air in the suction system, and
    a fire-fighting system having a reservoir containing an extinguishing fluid, a discharge pipe, of which a first end is fluidically connected to the reservoir, and a control system interposed between the reservoir and the discharge pipe that alternately adopts a closed position preventing the extinguishing fluid from flowing into the discharge pipe or an open position allowing the extinguishing fluid to flow into the discharge pipe, and
    wherein a second end of the discharge pipe opens directly into the transfer pipe so as to supply the discharge pipe, when the control system is in the open position.

2. A propulsion assembly for an aircraft, said propulsion assembly having:
    a primary duct and a secondary duct,
    an outer fairing having an external annular wall and an internal annular wall that delimit between them an outer compartment, wherein the external annular wall has an inlet opening,
    an inner fairing having an external annular wall and an internal annular wall that delimit between them an inner compartment, wherein the external annular wall has at least one air exhaust aperture,
    wherein the secondary duct is delimited between the internal annular wall of the outer fairing and the external annular wall of the inner fairing,
    wherein the primary duct is delimited inside the internal annular wall of the inner fairing,
    a suction system having an inlet, an outlet and mobile elements that are configured to draw air in via the inlet and deliver drawn-in air via the outlet,
    a drive means configured to drive the mobile elements,
    a transfer pipe fluidically connected to the outlet of the suction system,
    a distribution pipe disposed in the inner compartment, fluidically connected to the transfer pipe and having a plurality of nozzles,
    a supply pipe, of which one end opens into the outer compartment, and of which another end is fluidically connected to the inlet of the suction system,
    a regulating means configured and arranged to regulate a flow rate of air in the suction system, and
    a fire-fighting system having a reservoir containing an extinguishing fluid, a discharge pipe, of which a first end is fluidically connected to the reservoir, and a control system interposed between the reservoir and the discharge pipe that alternately adopts a closed position preventing the extinguishing fluid from flowing into the discharge pipe or an open position allowing the extinguishing fluid to flow into the discharge pipe, and
    wherein a second end of the discharge pipe opens directly into the outer compartment to supply the transfer pipe, when the control system is in the open position.

3. The propulsion assembly according to claim 1, wherein the fire-fighting system also has a discharge sub-pipe, of which a first end opens into the discharge pipe, and of which a second end opens into the outer compartment.

4. The propulsion assembly according to claim 3,
    wherein the control system has a first control sub-system and a second control sub-system,
    wherein the first control sub-system controls the flow of the extinguishing fluid into the discharge pipe, and
    wherein the second control sub-system controls the flow of the extinguishing fluid into the discharge sub-pipe.

5. An aircraft having at least one propulsion assembly according to claim 1.

6. An aircraft having at least one propulsion assembly according to claim 2.

* * * * *